(12) United States Patent  (10) Patent No.: US 6,353,795 B1
Ranjan  (45) Date of Patent: Mar. 5, 2002

(54) METHOD AND SYSTEM FOR MATCHING AN INCIDENT TO A ROUTE

(75) Inventor: Peeyush Ranjan, Sammamish, WA (US)

(73) Assignee: InfoSpace, Inc., Redmond, WA (US)

( * ) Notice: Subject to any disclaimer, the term of this patent is extended or adjusted under 35 U.S.C. 154(b) by 0 days.

(21) Appl. No.: 09/495,812

(22) Filed: Feb. 1, 2000

(51) Int. Cl.$^7$ .............................. G01G 21/26; G06G 7/70
(52) U.S. Cl. ...................... 701/202; 701/117; 701/210; 340/905
(58) Field of Search .................................. 701/202, 200, 701/210, 211, 117, 113; 340/905, 988, 989, 935

(56) References Cited

U.S. PATENT DOCUMENTS

| | | | | |
|---|---|---|---|---|
| 4,350,970 A | * | 9/1982 | van Tomkewitsch | 340/989 |
| 5,164,904 A | * | 11/1992 | Summer | 701/117 |
| 5,173,691 A | * | 12/1992 | Summer | 340/905 |
| 5,182,555 A | * | 1/1993 | Summer | 340/905 |
| 5,371,678 A | * | 12/1994 | Nomura | 701/210 |
| 5,539,645 A | * | 7/1996 | Mandhyan et al. | 701/119 |
| 5,862,510 A | * | 1/1999 | Saga et al. | 701/211 |
| 5,911,773 A | * | 6/1999 | Mutsuga et al. | 701/200 |
| 6,097,313 A | * | 8/2000 | Takahashi et al. | 340/905 |
| 6,216,088 B1 | * | 4/2001 | Schulz et al. | 701/209 |

OTHER PUBLICATIONS http://www.trafficstation.com/help/AddingRoutes.html, "Quick Guide to Adding Routes," available at least as early as Apr. 27, 2000.

http://www.trafficstation.com/help/QuickCheck.shtml, "QuickCheck Help," available at least as early as Apr. 27, 2000.

http://www.trafficstation.com/press_release/vicin.html, Press Release entitled "Traffic Station Joins Forces with MapBlast! to Bring Personalized Traffic Information and Intelligent Routing to Internet Users," available at least as early as Jul. 8, 1999.

* cited by examiner

Primary Examiner—Jacques H. Louis-Jacques
(74) Attorney, Agent, or Firm—Christensen O'Connor Johnson Kindness PLLC

(57) ABSTRACT

The present invention provides a method and system for depicting an online map of a route along with any incidents on the route. To create the online map of a route along with any incidents on the route, a consumer first provides the origination and destination addresses of the route. Once the consumer provides the origination and destination addresses of the route a proposed route is provided for their approval. The consumer may modify the proposed route or accept it as the final route they desire. Next, the route is analyzed to determine if any traffic incidents have occurred upon it based on retrieved incident information compared with the route. This analysis comprises preparing the route by creating regions of interest around the segments composing the route, examining if any traffic incidents fall within one or more of the regions of interest, and then determining for those incidents that do fall within a region of interest if the incident is closer than a threshold value to any segment on the route. If it is, then the incident is on the route, and the final analysis determines on which segment of the route the incident should be place. The final route along with any incidents on the route is then depicted for the consumer via a

18 Claims, 14 Drawing Sheets

FIG. 12A

METHOD AND SYSTEM FOR MATCHING AN INCIDENT TO A ROUTE

FIELD OF THE INVENTION

This invention generally relates to mapping a route on a computer, and more specifically, a method for depicting an online map of a route along with any traffic incidents on the route.

BACKGROUND OF THE INVENTION

Communication networks are well known in the computer communications field. By definition, a network is a group of computers and associated devices that are connected by communications facilities or links. Network communications can be of a permanent nature, such as via cables, or can be of a temporary nature, such as connections made through telephone or radio links. Networks may vary in size, from a local area network (LAN) consisting of a few computers or workstations and related devices; to a wide area network (WAN) which interconnects computers and LANs that are geographically dispersed; to a remote access service (RAS) which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol (IP) along with higher level protocols such as the Transmission Control Protocol/Internet Protocol (TCP/IP) or the Uniform Datagram Packet/Internet Protocol (UDP/IP) to communicate with one another.

The Internet has recently seen explosive growth by virtue of its ability to link computers located throughout the world. As the Internet has grown, so has the World Wide Web (WWW). The WWW is a vast collection of interconnected or "hypertext" documents written in HyperText Markup Language (HTML) that are electronically stored at "Web sites" throughout the Internet. A Web site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator (URL) that provides the exact location of the linked document on a server connected to the Internet and describes the document. Thus, whenever a hypertext document is retrieved from any Web server, the document is considered to be retrieved from the WWW.

A consumer is allowed to retrieve hypertext documents from the WWW, i.e., a consumer is allowed to "surf the Web," via a Web browser. A Web browser, such as Netscape's NAVIGATOR® or Microsoft's INTERNET EXPLORER®, is a software program implemented by a Web client, i.e., the consumer's computer, to provide a graphical user interface (GUI) to the WWW. Upon request from the consumer via the Web browser, the Web client accesses and retrieves the desired hypertext document from the appropriate Web server using the URL for the document and a protocol known as HyperText Transfer Protocol (HTTP). HTTP is a higher-level protocol than TCP/IP and is designed specifically for the requirements of the WWW. It is used on top of TCP/IP to transfer hypertext documents between servers and clients.

At the advent of the WWW, the information stored on the Internet was generally static in nature and if one wanted to change the information provided on WWW sites it was necessary to manually configure the WWW site by rewriting the HTML code of the WWW site. However, at the present stage of development on the WWW, many WWW sites provide dynamic content that changes depending on a consumer's interaction between the Web browser on the consumer's computer and the WWW site.

There currently exist WWW sites that provide dynamic content such as online atlases and mapping services. Some of these online mapping services also provide traffic analysis and reporting of traffic incidents occurring on particular routes. However, these services determine if an incident occurs on a route by mapping the names or numbers of exits on particular highways or streets to determine where an incident is located. This does not adequately describe the locations of incidents, as a desired travel route may not have a named or numbered exit where an incident has occurred.

Accordingly, a more effective method and system for depicting an online map of a route along with any incidents on the route is needed. The method and system should provide a consumer with the capability to easily and quickly view a depiction of their desired route along with any current incidents on the route.

SUMMARY OF THE INVENTION

The present invention solves the above-described problems by providing a method and system for depicting a desired route as well as any traffic incidents occurring along that route. According to one actual embodiment of the invention, a WWW site is provided that allows a consumer to easily and quickly access an information server that will provide them with a depiction of their desired route along with any current incidents on the route. An information server is then provided to analyze the consumer's desired route by examining the latitudinal and longitudinal coordinates of the points along the route thereby allowing for greater accuracy when determining if an incident falls on a particular route.

In one actual embodiment of the present invention, the consumer first provides the origination and destination addresses of the route. In response, a mapping server provides a proposed route for the consumer's approval. The consumer may modify the proposed route or accept it as the final route they desire. Next, the route is analyzed to determine if any traffic incidents have occurred upon it based on retrieved incident information compared with the route. This analysis comprises preparing the route by creating regions of interest around the segments composing the route, examining if any traffic incidents fall within one or more of the regions of interest, and then determining for those incidents that do fall within a region of interest if the incident is closer than a threshold value to any segment on the route. If it is, then the incident is on the route, and the final analysis determines on which segment of the route the incident should be placed. The final route along with any incidents on the route is then depicted for the consumer via a WWW site or by some other device capable of depicting the route.

In accordance with yet other aspects of the invention, a method, a system, and a computer-readable medium containing instructions for depicting an online map of a route along with any incidents on the route are also provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
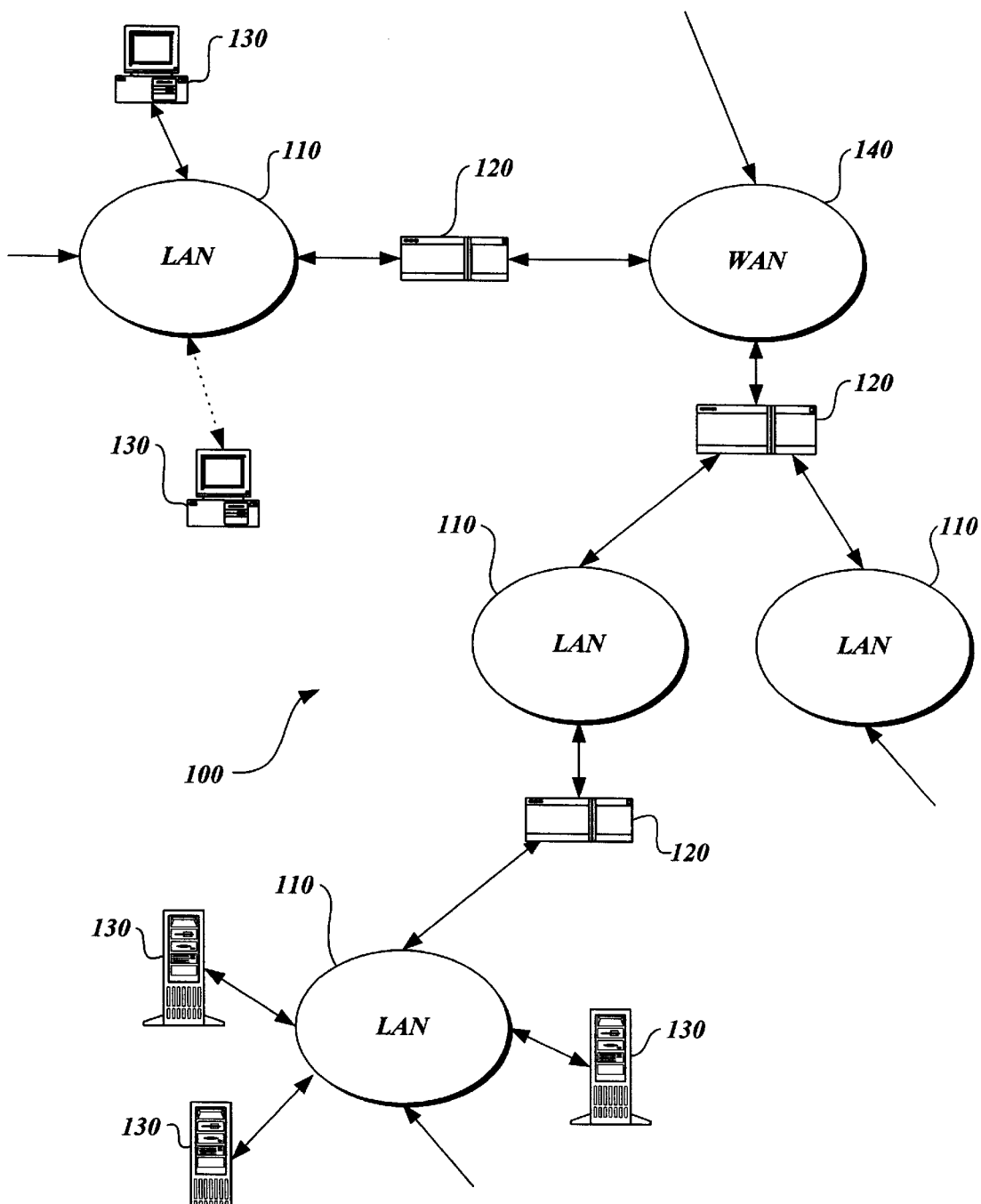
FIG. 1 (Prior Art) is a block diagram of a representative portion of the Internet.

As previously explained, the capitalized term "Internet" refers to the collection of networks and routers that use the Internet Protocol (IP) to communicate with one another. A representative section of the Internet 100 is shown in FIG. 1 (Prior Art) in which a plurality of local area networks (LANs) 110 and a wide area network (WAN) 140 are interconnected by routers 120. The routers 120 are generally special purpose computers used to interface one LAN or WAN to another.

Communication links within the LANs may be twisted wire pair, or coaxial cable, while communication links between networks may utilize 56 Kbps analog telephone lines, or 1 Mbps digital T-1 lines and/or 45 Mbps T-3 lines. Further computers and other related electronic devices can be remotely connected to either the LANs 110 or the WAN 140 via a modem and temporary telephone link. Such computers and electronic devices 130 are shown in FIG. 1 as connected to one of the LANs 110 via dotted lines. It will be appreciated that the Internet comprises a vast number of such interconnected networks, computers, and routers and that only a small, representative section of the Internet 100 is shown in FIG. 1.

Figure 2:
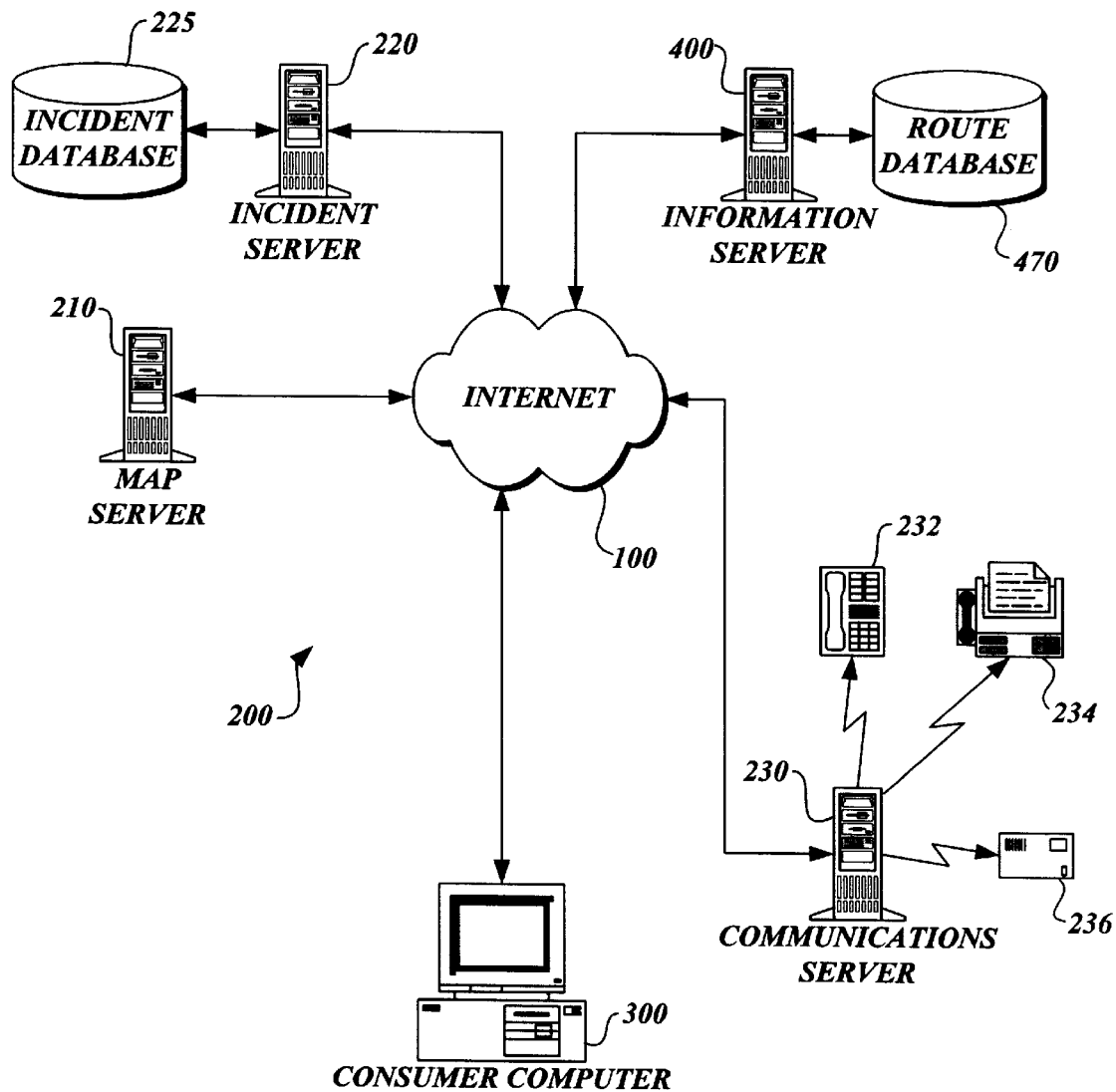
FIG. 2 is a pictorial diagram of a system of devices connected to the Internet, which depict the travel route in accordance with the present invention.

The World Wide Web (WWW), on the other hand, is vast collection of interconnected, electronically stored information located on servers connected throughout the Internet 100. Many companies are now providing services and access to their content over the Internet 100 using the WWW. In accordance with the present invention and as shown in FIG. 2, a consumer requests information about a desired route over the Internet 100 via a Web browser 500 installed on a consumer's computer and receives a description of the desired route along with any incidents that fall on the route. More specifically, the consumer requests information on a desired route from a computer 300 connected to the Internet 100. The request is processed by an information server 400 located elsewhere on the Internet 100. If the information server 400 does not find the route in its route database 470, it requests route data from a map server 210 also located elsewhere on the Internet 100. The information server 400 also requests incident data that describes the location of incidents using latitudinal and longitudinal coordinates from an incident server 220 located elsewhere on the Internet 100. The incident server 220 then retrieves the incident data from its incident database 225. Once the information server 400 receives the incident data and route data it compares the incident data to the route data, to determine if any incidents fall on the desired route.

The system 200 of computers and devices to which the information server 400 is connected and to which the consumer's computer 300 is also connected is shown in more detail in FIG. 2. In addition to the information server 400, the system 200 includes a map server 210 used to supply route data to the information server 400. The system 200 also includes an incident server 220 that retrieves incident data from its incident database 225 to supply the information server 400 with incident data. Finally the system 200 also includes a communications server 230 used by the information server 400 to communicate with devices not connected directly to the Internet 100 such as telephones 232, facsimile machines 234 and pagers 236. However, those of ordinary skill in the art will appreciate that in other embodiments of the present invention, the capabilities of the map server 210, the incident server 220 and/or the communications server 230 may all be embodied in the information server. Consequently, it would be appreciated that in these embodiments, the map server 210, the incident server 220 and/or the communications server 230 would be unnecessary. Additionally, those of ordinary skill in the art will recognize that while only one consumer computer 300, and information server 400 are depicted in FIG. 2, numerous consumer computers 300 and information servers 400 equipped with the hardware and software components described below may be connected to the Internet 100.

Figure 3:
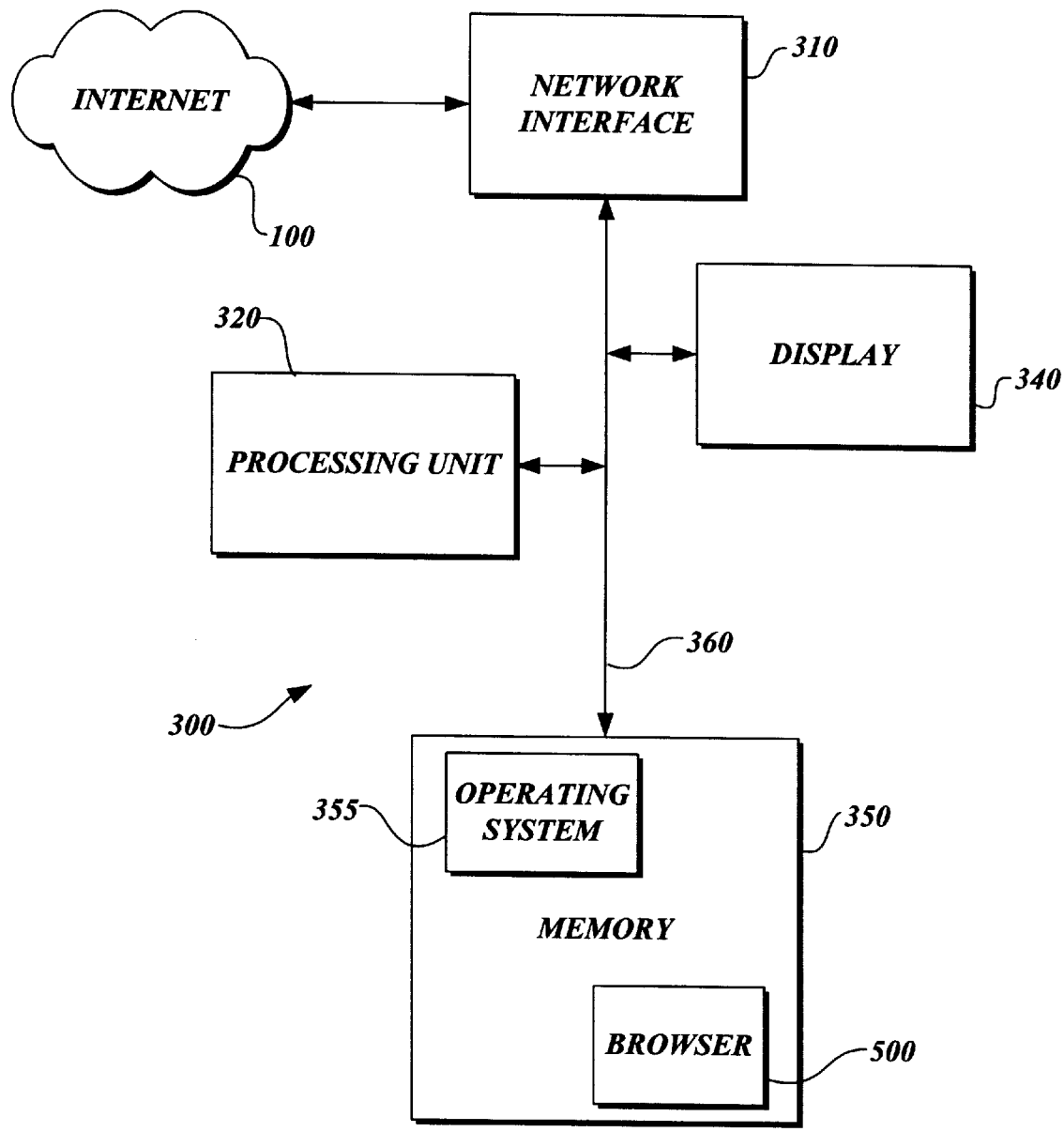
FIG. 3 is a block diagram of the several components of the consumer's computer shown in FIG. 2 that is used to request information on a particular route in accordance with the present invention.

FIG. 3 depicts several of the key components of the consumer's computer 300. Those of ordinary skill in the art will appreciate that the consumer's computer 300 includes many more components then those shown in FIG. 3. However, it is not necessary that all of these generally conventional components be shown in order to disclose an illustrative embodiment for practicing the present invention. As shown in FIG. 3, the consumer's computer includes a network interface 310 for connecting to the Internet 100. Those of ordinary skill in the art will appreciate that the network interface 310 includes the necessary circuitry for such a connection, and is also constructed for use with the TCP/IP protocol.

The consumer's computer 300 also includes a processing unit 320, a display 340, and a memory 350 all interconnected along with the network interface 310 via a bus 360. The memory 350 generally comprises a random access memory (RAM), a read-only memory (ROM) and a permanent mass storage device, such as a disk drive. The memory 350 stores the program code necessary for requesting and/or depicting a desired route over the Internet 100 in accordance with the present invention. More specifically, the memory 350 stores a Web browser 500, such as Netscape's NAVIGATOR or Microsoft's INTERNET EXPLORER browsers, used in accordance with the present invention for depicting a desired route over the Internet 100. In addition, memory 350 also stores an operating system 355. It will be appreciated that these software components may be stored on a computer-readable medium and loaded into memory 350 of the consumer's computer 300 using a drive mechanism associated with the computer-readable medium, such as a floppy, tape or CD-ROM drive.

Figure 4:
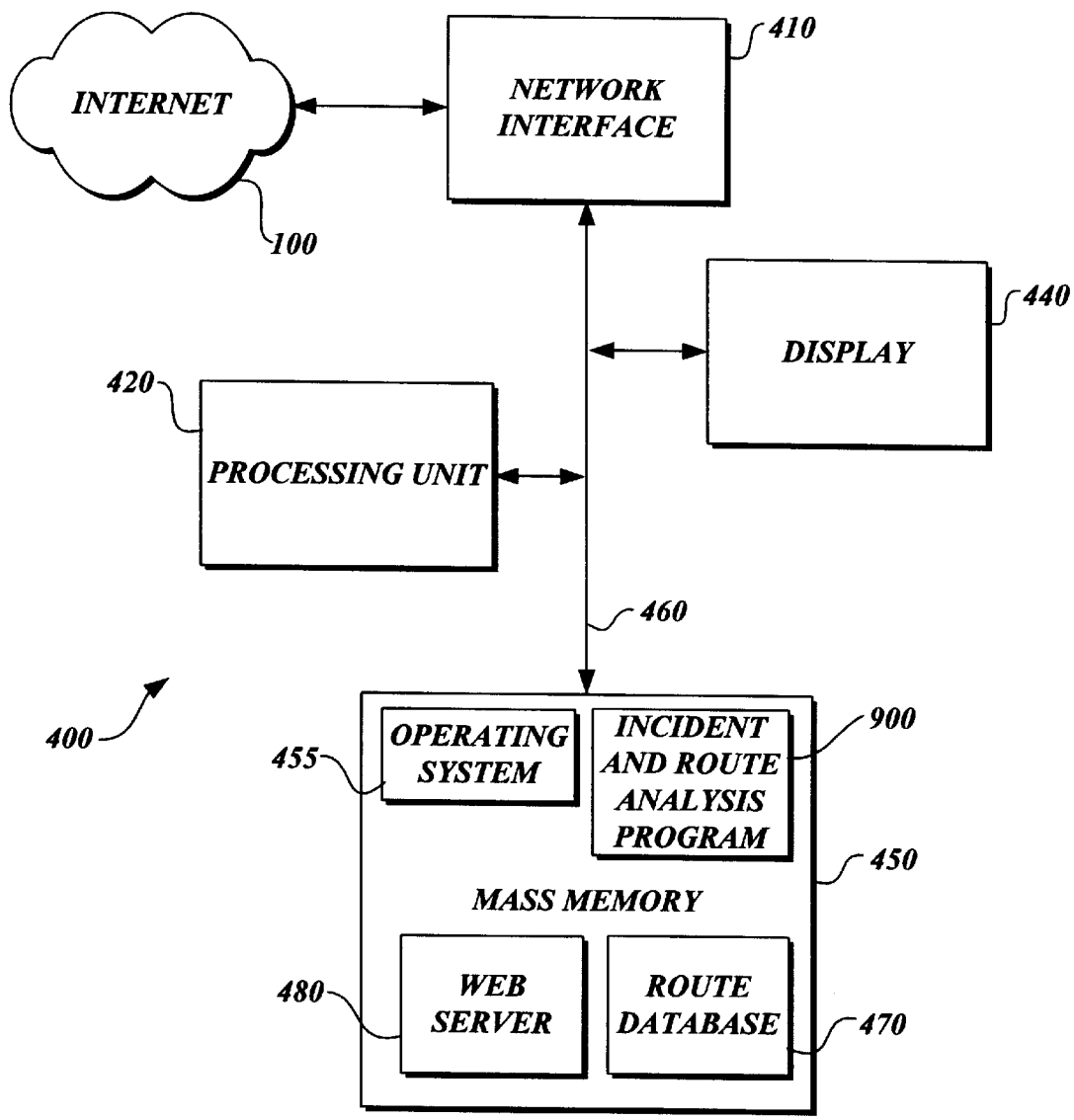
FIG. 4 is a block diagram of the several components of an information server shown in FIG. 2 that is used to supply information on a particular route in accordance with the present invention.

As will be described in more detail below, the products ordered by the consumer are supplied by a remote server, i.e., the information server 400 located elsewhere on the Internet as illustrated in FIG. 2. FIG. 4 depicts several of the key components of the information server 400. Those of ordinary skill in the art will appreciate that the information server 400 includes many more components then those shown in FIG. 4. However, it is not necessary that all of these generally conventional components be shown in order to disclose an illustrative embodiment for practicing the present invention. As shown in FIG. 4, the information server 400 is connected to the Internet 100 via a network interface 410. Those of ordinary skill in the art will appreciate that the network interface 410 includes the necessary circuitry for connecting the information server 400 to the Internet 100, and is constructed for use with the TCP/IP protocol.

The information server 400 also includes a processing unit 420, a display 440, and a mass memory 450 all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present invention. More specifically, the mass memory 450 stores an incident and route analysis program 900 formed in accordance with the present invention for depicting travel routes along with traffic incidents occurring on those travel routes. In addition, mass memory 450 stores a database 470 of consumer information continuously logged by the information server 400 consumer's route preferences. It will be appreciated by those of ordinary skill in the art that the database 470 of product and logged information may also be stored on other servers or storage devices connected to the either the information server 400 or the Internet 100. Finally, mass memory 450 stores Web server software 480 for handling requests for stored information received via the Internet 100 and the WWW, and an operating system 455. It will be appreciated that the aforementioned software components may be stored on a computer-readable medium and loaded into mass memory 450 of the information server 400 using a drive mechanism associated with the computer-readable medium, such as floppy, tape or CD-ROM drive.

Figure 5:
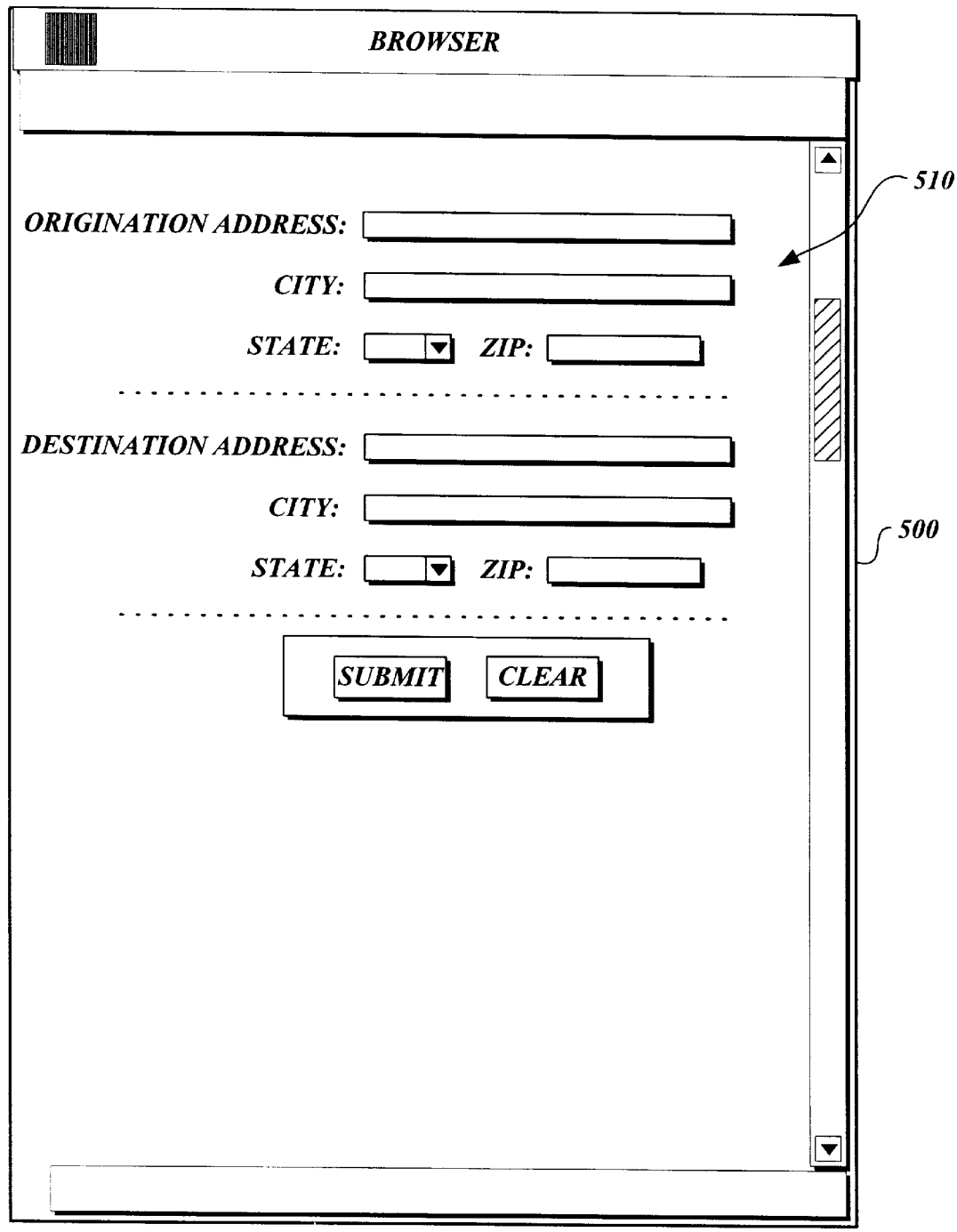
FIG. 5 illustrates a Web page produced by a Web browser installed on the consumer's computer from which the consumer enters the origination and destination of the consumer's desired route.
Figure 6:
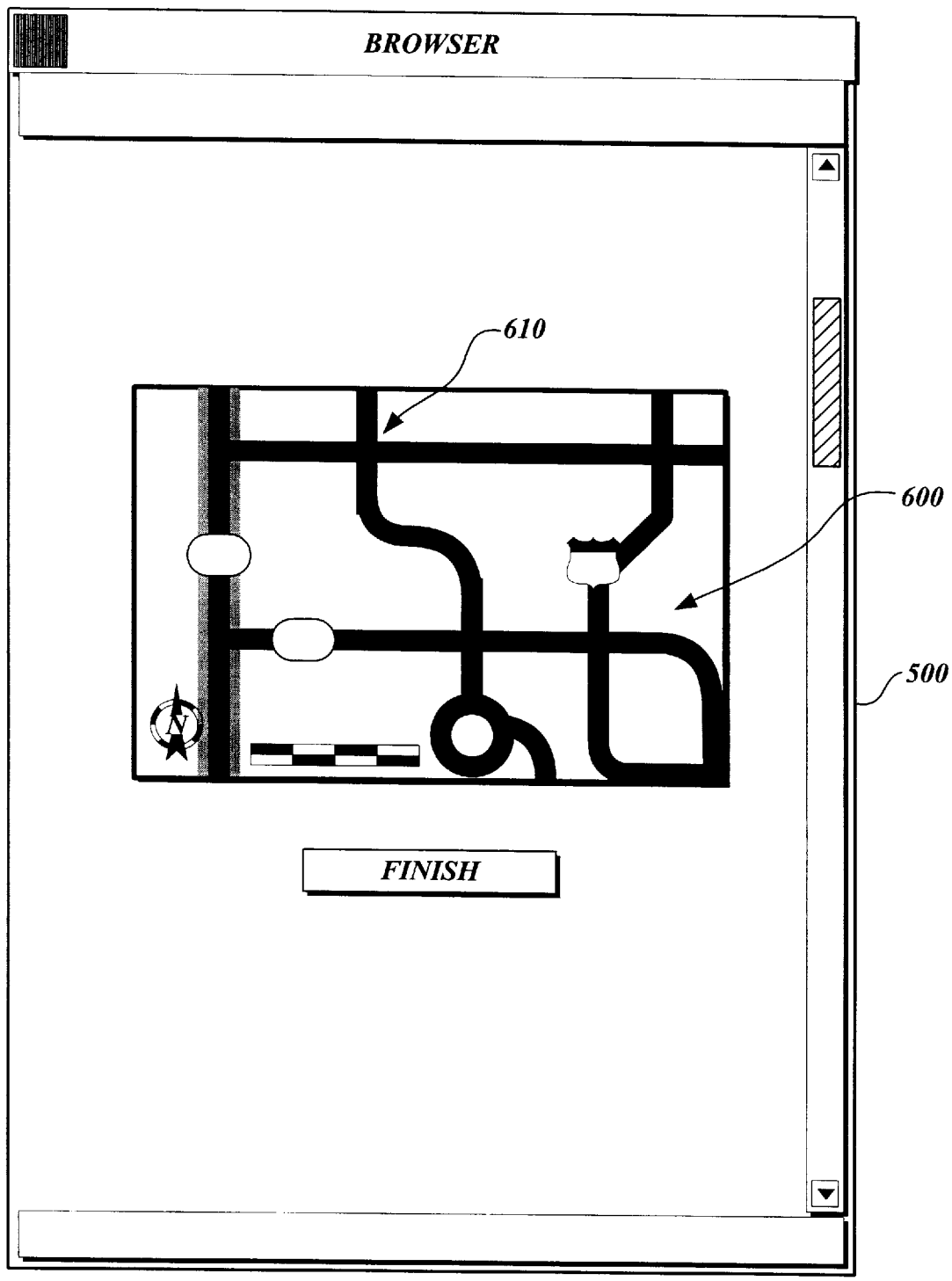
FIG. 6 illustrates a Web page produced by a Web browser installed on the consumer's computer displaying a possible route for the consumer's approval.
Figure 7:
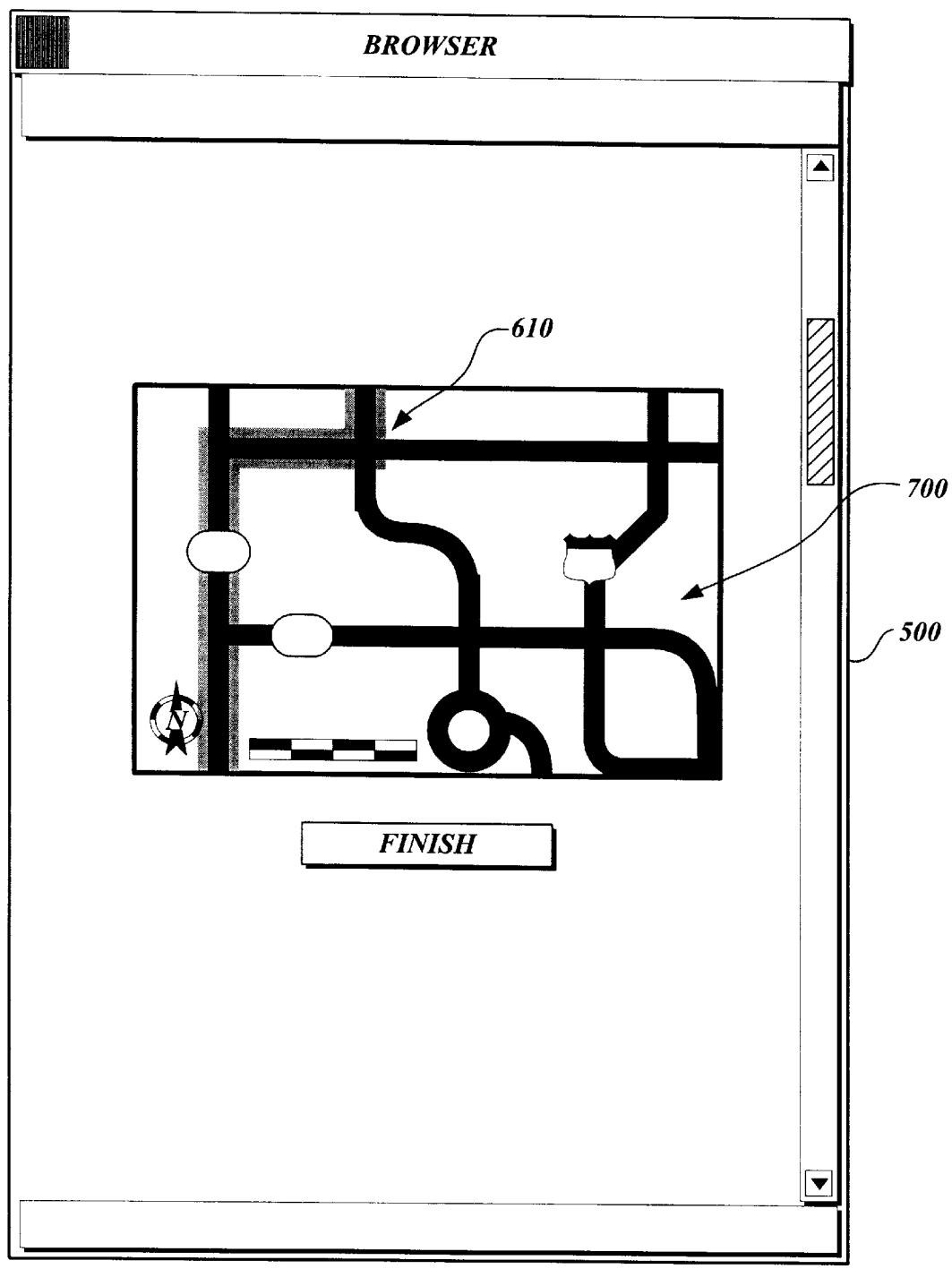
FIG. 7 illustrates a Web page produced by a Web browser installed on the consumer's computer displaying the consumer's desired route.
Figure 8:
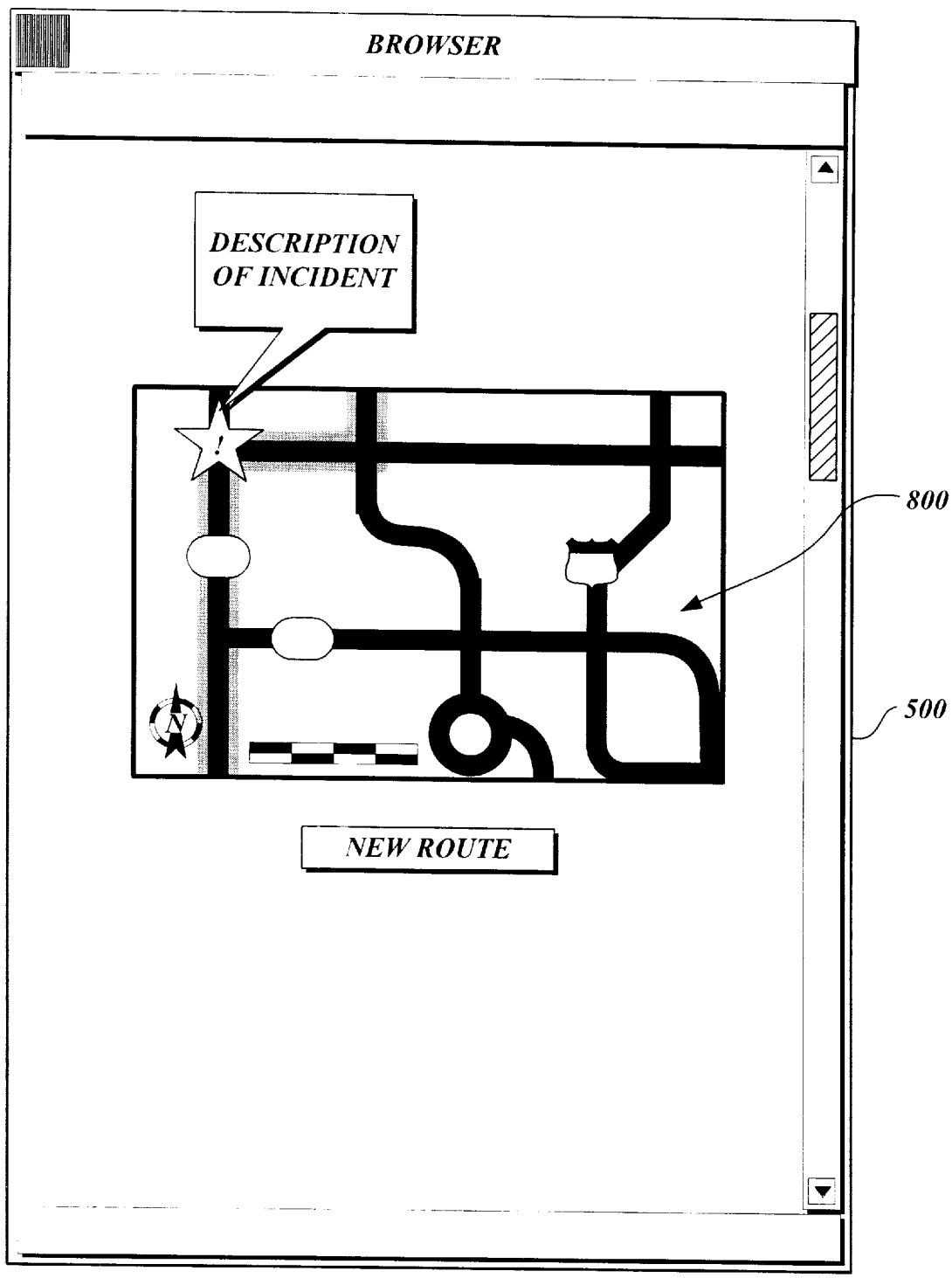
FIG. 8 illustrates a Web page produced by a Web browser installed on the consumer's computer displaying the consumer's desired route with any incidents occurring on that route.

Consumer computers, such as computer 300, are generally provided with a Web browser such as Microsoft's INTERNET EXPLORER or Netscape's NAVIGATOR to provide the consumers with a GUI to the Internet 100 and the WWW. FIG. 5 illustrates a Web page 510 displayed by a Web browser 500 installed on the consumer's computer 300 from which the consumer enters the origination and destination addresses of the consumer's desired route and submits it to the information server 400. Once received, the information server 400 processes the origination and destination addresses and passes a request for a route based on the origination and destination addresses to the map server 210. As is already well known in the art, the map server 210 returns route data such as would be used to create a map Web page 600 displayed by Web browser 500 in FIG. 6 showing a possible route for the consumer's approval. As those of ordinary skill in the art will appreciate, the consumer might modify the route by indicating to the information server 400 a key intersection 610 that the route must pass through. Accordingly, the information server 400 requests another set of route data from the map server 210 that includes the key intersection 610. Accordingly, the map server 210 returns route data that is used to create a modified map Web page 700 displayed by Web browser 500 in FIG. 7 wherein the route now passes through the key intersection 610. Once the consumer has finalized their desired route, the information server 400 will, in accordance with the present invention as described in more detail below, analyze the desired route and the incident data from the incident server 220 to produce a incident map Web page 800 as illustrated in FIG. 8 displaying the consumer's desired route with any incidents occurring on that route.

Figure 9:
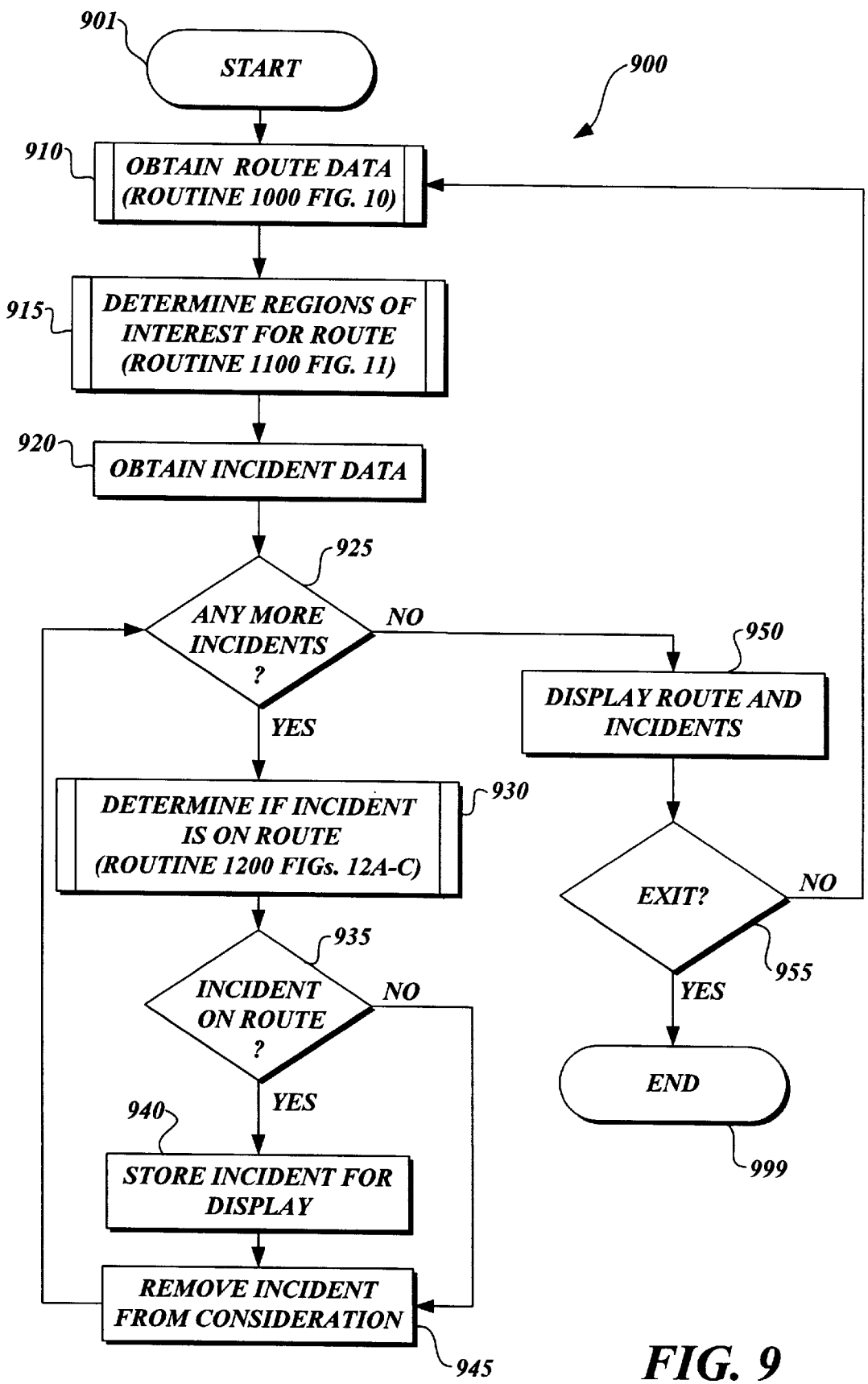
FIG. 9 is a flow chart illustrating the logic of a main routine used by the information server shown in FIG. 2 to receive and process the consumer's desired route and then locate any incidents on the route.

FIG. 9 is a flow chart illustrating the logic implemented by the incident and route analysis program 900 residing on the information server 400 to process the consumer's desired route and then locate any incidents on the route. The logic begins in block 901 and proceeds to block 910, where route data is obtained from the map server 210 in response to the consumer's submission of an origination and destination address as described above. An illustrative subroutine 100 for obtaining route data is described below with reference to FIG. 10. Routine 900 then continues from block 910 to block 915.

At block 915 the routine 900 prepares the route for analysis by finding regions of interest near the route which should be examined for traffic incidents. An illustrative subroutine 1100 for finding the regions of interest near the desired route is described below with reference to FIG. 11A. Once the regions of interest are found, routine 900 continues from block 915 to block 920.

At block 920 the routine 900 obtains incident data from the incident server 220, which maintains in the incident database 225 latitude and longitude coordinates identifying the location of any incidents reported to the incident server 220. For example, the latitude and longitude coordinates of all traffic incidents occurring in the state of Washington may be reported to the incident server 220 and thus, may be retrieved by the information server 400. However, it may be desirable and more efficient to limit the retrieval of the incidents to a particular geographic area, such as the Seattle metropolitan area. It will be appreciated by those of ordinary skill in the art, that given a route comprised of latitude and longitude coordinates it is possible to thereby determine the latitude and longitude coordinates of a geographic region from which to limit the retrieval of incidents. Once the incident data is retrieved, routine 900 continues from block 920 to a decision block 925 where it determines whether the retrieved incident data contains the coordinates for any further incidents. In one actual embodiment of the present invention, the consumer indicates the particular geographic area to which incident information should be limited. However, in yet other embodiments of the present invention, the incident route analysis program 900 automatically selects the geographic area based on the desired route.

If at decision block 925 it is determined that the incident data does not contain the latitude and longitude coordinates for at least one incident, routine 900 branches to block 950 where the route and any previously identified and stored incidents are served to the consumer's computer 300 and displayed by the Web browser 500 to the consumer via a Web page 800 such as that shown in FIG. 8. Next, in a block 955, the routine 900 determines if the consumer has requested to exit the incident route and analysis program 900, or elected to analyze a new route. If a new route is elected, the routine returns to block 910 of FIG. 9. However, if the consumer elects to exit the program, the program ends in a block 199.

Returning to decision block 925, if the incident data contains the coordinates for at least one incident, routine 900 continues to block 930. At block 930, the incident data describing the first (and perhaps only) incident is compared with the route data retrieved from the route database 470 and approved by the consumer to determine if the incident lies on the route. A subroutine 1200 for determining if an incident lies on a route in accordance with one actual embodiment of the present invention is described below with reference to FIGS. 12A–12C. Once the results of the subroutine 1200 are returned in block 930, routine 900 proceeds to a decision block 935 where the results of routine 1200 are used to determine if the incident falls on the route.

If the result of decision block 935 is positive, routine 900 proceeds to block 940 where the incident defined by latitude and longitude coordinates is stored for use later in block 950. Routine 900 then proceeds to a block 945 where the incident examined in subroutine 1200 is removed from the incident data so that it will not be considered again. On the other hand, if at block 925 it is determined that the incident does not fall on the desired route, the incident is not stored for later display and instead, routine 900 proceeds directly to block 945 where the incident examined in subroutine 1200 is removed from the incident data so that it will not be considered again.

Routine 900 then proceeds back to block 925 to determine if any more incidents need to be compared with the route. Blocks 935 through 945 are repeated for each available incident retrieved from the incident server 220. However, if there are no further available incidents to process, the routine proceeds to block 950 in which the route approved by the consumer is served to the consumer's computer and displayed as a Web page 800 along with each of the incidents determined to have fallen on that route. Next, in a block 955, the logic determines if the consumer has requested to exit the incident route and analysis program 900, or elected to analyze a new route. If a new route is elected the routine returns to block 910 of FIG. 9 and blocks 910–999 are repeated to analyze the new route. However, if the consumer elects to exit the program, the program ends in a block 199.

Figure 10:
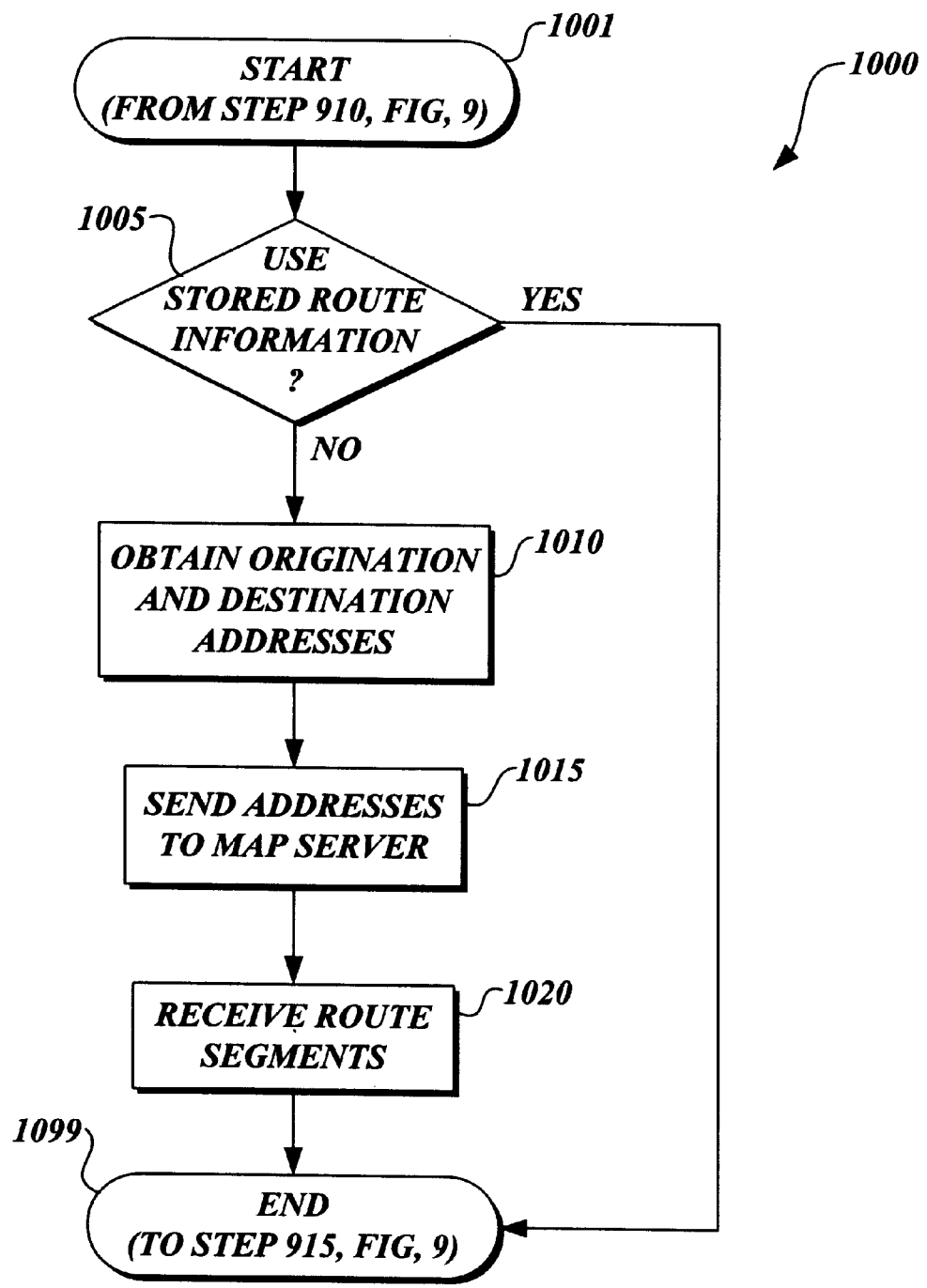
FIG. 10 is a flow chart illustrating the logic used by a subroutine of FIG. 9 to receive the consumer's desired route.

Now that the main routine of the incident and route analysis program 900 has been described, the subroutines called by the main routine and noted above will be described in more detail. Referring now to FIG. 10, the subroutine 1000 performed by the information server 400 for obtaining a consumer's desired route in accordance with one actual embodiment of the present invention is illustrated. Subroutine 1000 starts at block 1001 and proceeds to a decision block 1005 where it determines whether the information server 400 has a desired route in its route database 470 for the consumer. Those of ordinary skill in the art will appreciate that if the consumer has previously logged in and used the traffic analysis Web site formed in accordance with the present invention before, the information server 400 may have stored the route previously desired by the user. Hence, if the result at decision block 1005 is positive, the information server 400 can use the previously stored route to perform its analysis. Accordingly, subroutine 1000 branches to a block 1099 where it ends. If at decision block 1005 a determination is made that the information server 400 does not have a previously stored desired route in its route database 470 for the consumer, subroutine 1000 proceeds to block 1010 where the information server 400 obtains the origination and destination addresses from the Web browser 500 on the consumer computer 300 as entered in the Web page 510 shown in FIG. 5.

Next, in a block 1015, the origination and destination addresses obtained from the consumer are sent to the map server 210. Subroutine 1000 proceeds to a block 1020 where the map server 210 returns, and the information server 400 receives, the best route corresponding to the addresses sent in block 1015. It will be appreciated that the route returned by the map server 210 comprises a plurality of segments, each segment having a pair of end points defined by latitude and longitude. In one actual embodiment of the present invention, the segments comprising the route are of equal length. However, in yet another embodiment of the present invention the segments may be of unequal lengths. The routine 100 then ends in a block 1099 and processing returns to block 915 in FIG. 9, where the route obtained in block 910 is prepared for analysis.

Figure 11A:
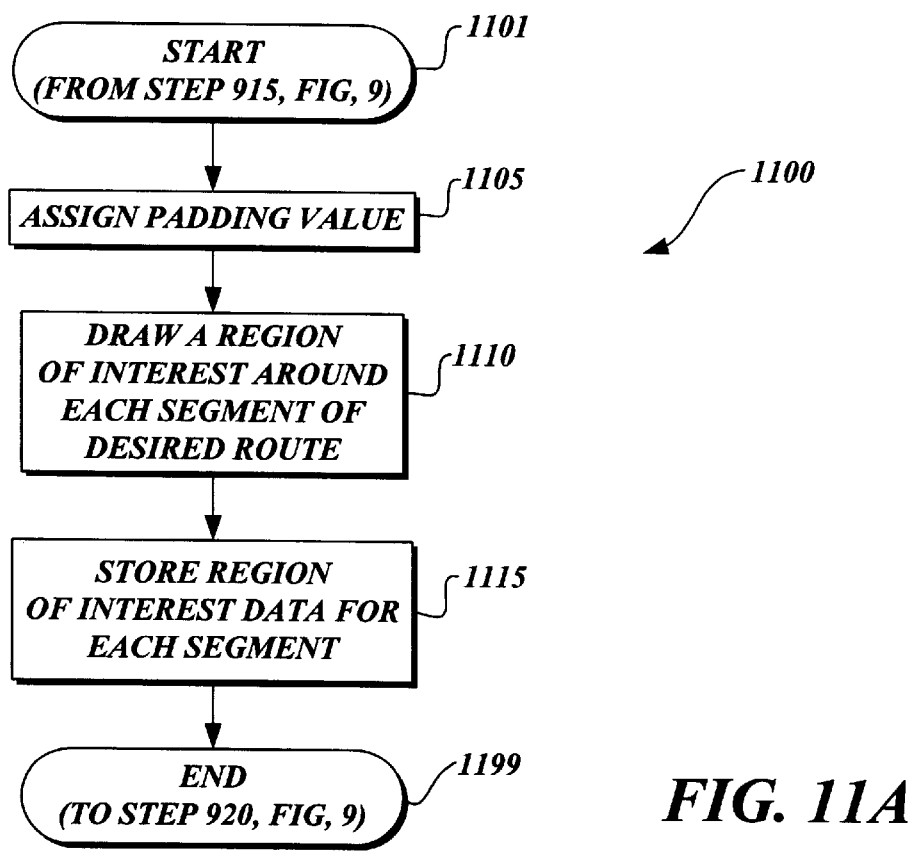
FIG. 11A is a flow chart illustrating the logic used by a subroutine of FIG. 9 to determine regions of interest along the consumer's desired route.

FIG. 11A depicts the subroutine 1100 performed by the information server 400 for determining the regions of interest around the consumer's route in accordance with one actual embodiment of the present invention. Subroutine 1100 starts at block 1101 and proceeds to block 1105 where a padding value is assigned which is used, as described in more detail below, to define a distance from each segment of the desired route to a perimeter surrounding the segment. The area within the perimeter (as defined by latitude and longitude coordinates) is referred to as the region of interest for each segment.

Although in one actual embodiment of the invention, the padding value is static and preprogrammed, in other actual embodiments the padding value may vary as the granularity of the desired route, i.e., the number and length of segments in the route, changes so as to provide a more accurate calculation of the regions of interest surrounding the desired route. One possible method of assigning a padding value that varies with the route granularity is to calculate the padding value as: half the average length of the route segments in the desired route. It will be appreciated by those of ordinary skill in the art that other calculations of the padding value may be used that also vary with the granularity of the route. Regardless, once the padding value is assigned, subroutine 1100 proceeds from a block 1105 to block 1110.

Figure 11B:
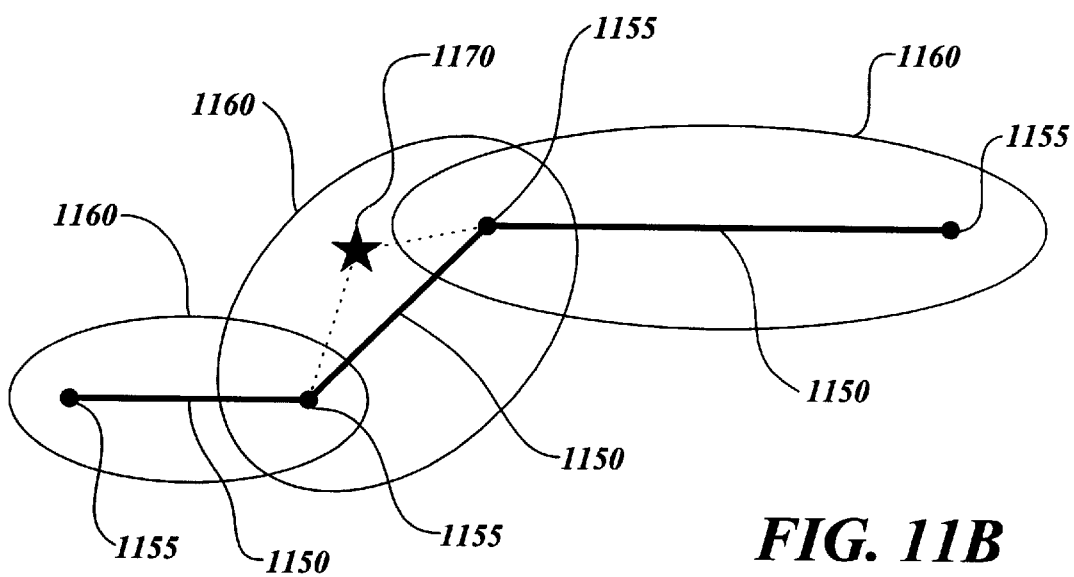
FIG. 11B is a diagram depicting the regions of interest determined by the subroutine shown in FIG. 11A.

At block 1110, a perimeter is drawn around each segment of the desired route using the previously assigned padding value so as to form a region of interest around each segment of the desired route. Desirable characteristics of the region of interest are that it should be quick and easy to determine if a location falls inside or outside its perimeter. A substantially elliptical perimeter has these desirable properties. More specifically, if the sum of the distances from any incident location to both foci of an ellipse is less than the sum of the distances from both foci to any point on the ellipse, which is a constant value for that ellipse, then the incident location falls within the ellipse. Accordingly, at block 1110 and as shown in FIG. 11B a perimeter 1160 is formed around each segment 1150 of the desired route by creating an ellipse around the segment such that the end points 1155 of the segment are the foci of the ellipse and the sum of the distances from the end points to the edge of the ellipse is the length of the segment padded by twice the padding value assigned in block 1105. Next, in a block 1115 the latitude and longitude coordinates for regions of interest formed in block 1110 are stored for use later in analyzing the desired route. Subroutine 1100 then ends in a block 1199 and processing returns to block 920 in FIG. 9. It will be appreciated by those of ordinary skill in the art that regions of interest may be drawn in other than a substantially elliptical shape without departing from the scope of the present invention.

Figure 12A:
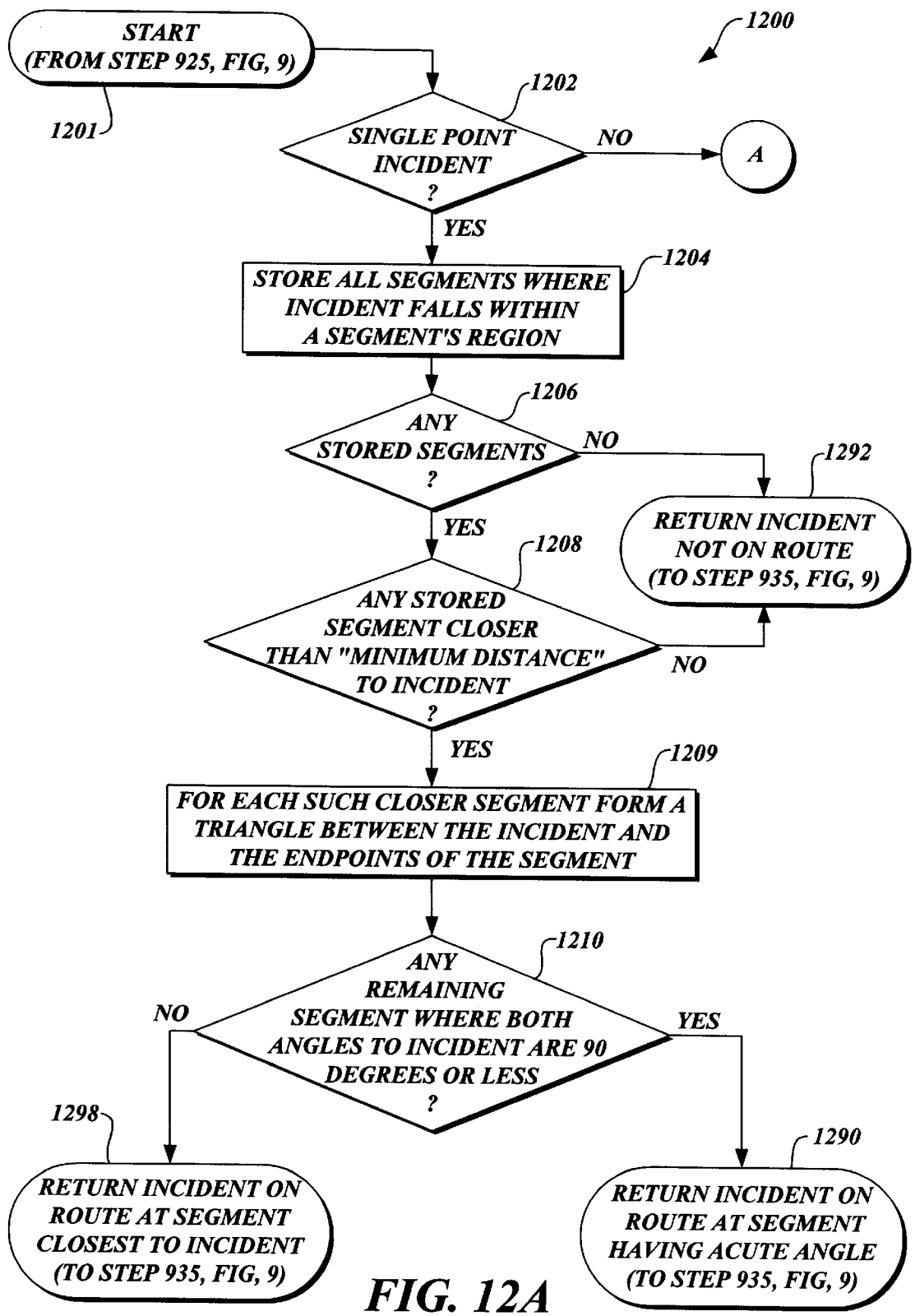
FIGS. 12A–12C are a flow chart illustrating the logic used by a subroutine of FIG. 9 to determine where any incidents fall on the consumer's desired route.
Figure 12B:
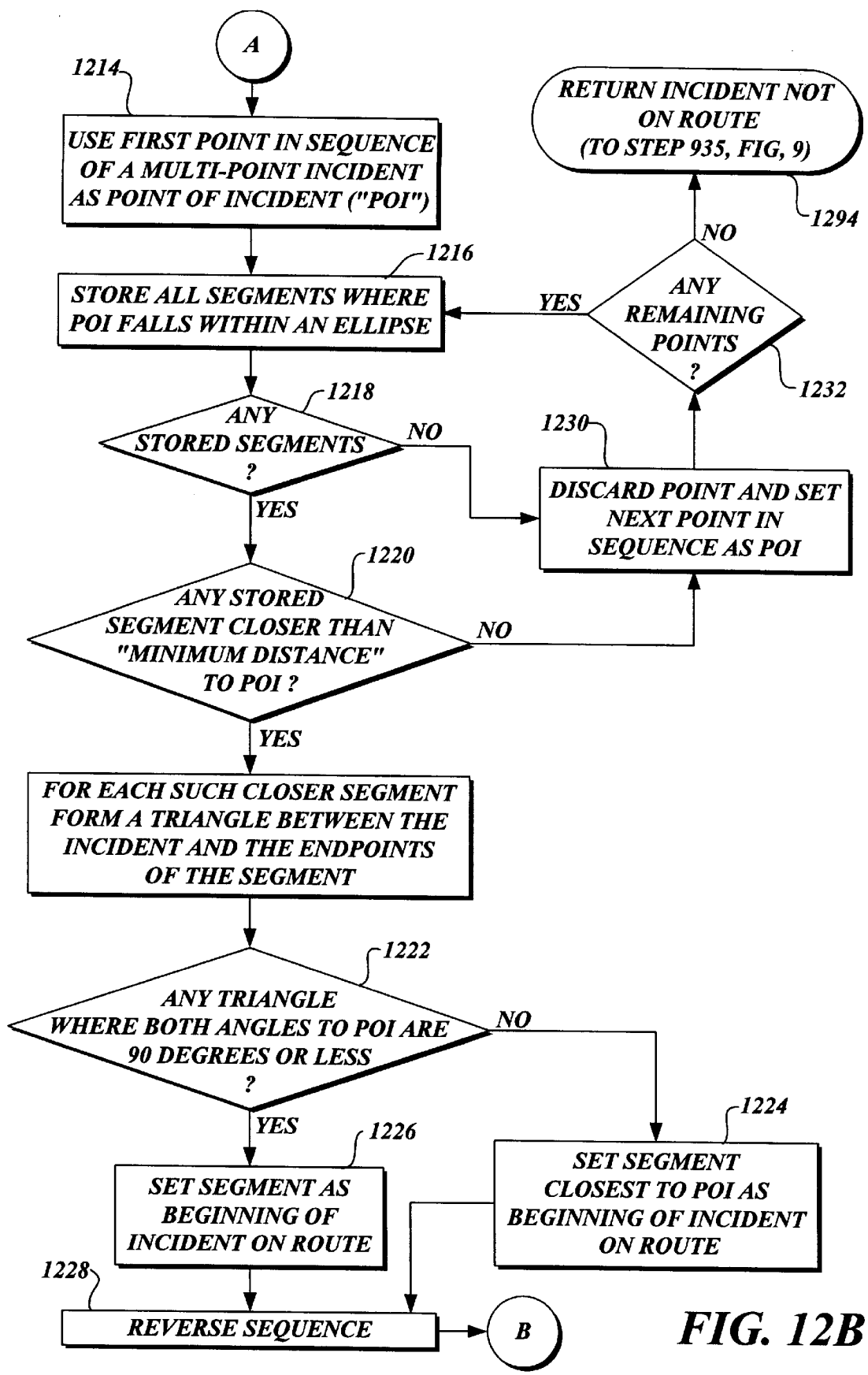
Figure 12C:
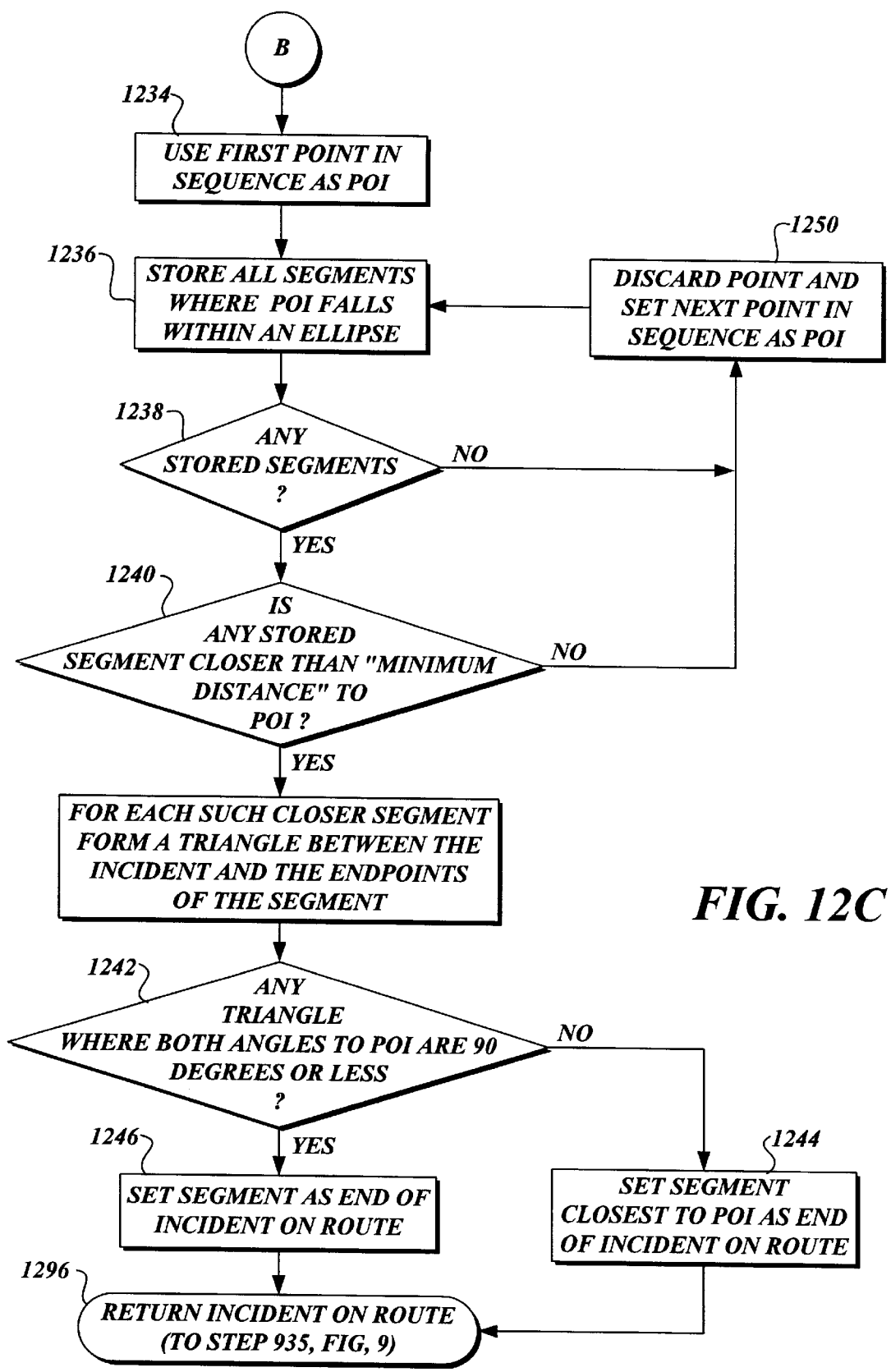

Referring now to FIGS. 12A–12C, the subroutine 1200 performed by the information server 400 for analyzing the desired route (including regions of interest) and incident data to determine whether an incident lies on the desired route is depicted. Subroutine 1200 starts at a block 1201 and proceeds to a block 1202 where it determines whether the incident occurs at a single location on the route or whether it occurs on multiple points along the route, i.e., at a multi-point location.

If the incident occurs along multiple points on the route, i.e., a multi-point location, subroutine 1200 branches to a block 1214 in FIG. 12B which will be described in more detail below. Otherwise, the incident occurs at a single point on the route, i.e., at a single location, subroutine 1200 proceeds to a block 1204. At block 1204, the single point incident is compared with all segments of the desired route to determine if the incident is located within the region of interest of any of the segments. Accordingly, all segments whose regions of interest enclose the incident are stored for further analysis. Next, at block 1206, subroutine 1200 determines whether any segments were stored in block 1204. If not, routine 1200 branches to block 1292 where it ends and processing returns to block 935 in FIG. 9 indicating that the incident does not fall on the desired route. However, if it is determined that at least one segment was stored in block 1204, then routine 1200 proceeds to a decision block 1208.

At decision block 1208, subroutine 1200 determines whether the single point incident is closer than a minimum distance to any point along any of the segments stored in block 1204. In one actual embodiment of the present invention, this minimum distance varies with the granularity of the route. Accordingly, a value substantially similar to the padding value assigned in block 1105 of FIG. 11A is used as the minimum distance. If it is determined that no stored segments are closer than the minimum distance to the single point incident, subroutine 1200 branches to block 1292 where the subroutine ends and processing returns to block 935 in FIG. 9 indicating that the incident does not fall on the desired route. If it is determined that at least one segment is closer than the minimum distance to the incident, subroutine 1200 proceeds to block 1209.

In block 1209, subroutine 1200 forms a triangle such as that shown in FIG. 11B between the incident 1170 and the end points 1155 of each segment 1150 that is closer than the minimum distance. Specifically, the triangle is formed such that the segment 1150 is the base of the triangle and the two other sides of the triangle are formed from the end points of the segment 1155 to the location of the single point incident 1170. Accordingly, at a decision block 1210, subroutine 1200 determines whether any of the triangles formed in block 1209 include angles formed off of the base that are ninety (90) degrees or less. If the result of decision block 1210 is positive, subroutine 1200 ends in a block 1290 and processing returns to block 935 in FIG. 9 indicating that the single point incident falls on the desired route at the segment where the angles formed off of the base of the triangle are ninety (90) degrees or less. It will be appreciated that if more than one segment that is closer than a minimum distance forms such a triangle, then any one of such segments may be returned to the main incident and route analysis routine at block 935 of FIG. 9. However, if it is determined that no segment closer than a minimum distance forms such a triangle, subroutine 1200 ends in a block 1298 and processing returns to block 935 in FIG. 9 indicating that the incident falls on the desired route at the segment of the desired route having a point closest to the incident.

Referring now to FIG. 12B, if the incident occurs at multiple points along the desired route, subroutine 1200 continues at a block 1214 where the first point in the sequence of points along the multi-point incident is chosen for analysis as the "point of incident" (POI). At a decision block 1216, the POI is compared with all segments of the desired route to determine if the POI is located within the region of interest of any segments. Accordingly, all segments whose perimeters enclose the POI are stored for further analysis. At a decision block 1218, subroutine 1200 determines whether any segments were stored in block 1216. If no segments were stored, then subroutine 1200 branches to a block 1230 where the POI is discarded from further consideration and the next available point along the multi-point incident is assigned as the POI. Routine 1200 then proceeds to block 1232 where it determines whether any points remain of the multi-point incident. If no points remain, subroutine 1200 ends in a block 1294 and processing returns to block 935 in FIG. 9 indicating that the incident does not fall on the desired route. Otherwise, if at least one point remains of the multi-point incident, subroutine 1200 branches back to block 1216 to continue the analysis of the multi-point incident.

Returning now to decision block 1218, if at least one segment was stored in block 1216, i.e., if the current POI fell in the region of interest of at least one segment, then subroutine 1200 proceeds to block 1220, where it determines whether the current POI is closer than a minimum distance to any point along any of the segments stored in block 1216. As noted above, in one actual embodiment of the present invention this minimum distance varies with the granularity of the route. Accordingly, a value substantially similar to the padding value assigned in block 1105 of FIG. 11A is used as the minimum distance. If no stored segments are closer than a minimum distance to the current POI, then subroutine 1200 branches to block 1230 as described above and the POI is discarded. However, if at least one segment is closer than the minimum distance to the POI, subroutine 1200 proceeds to a block 1221 in which a triangle (such as that shown in FIG. 11B) is formed between the current POI and the end points of each segment that is closer than the minimum distance. Specifically, each triangle is formed such that the segment is the base of the triangle and the two other sides of the triangle are formed from the end points of the segment to the location current POI.

Next, in a decision block 1222, the subroutine 1200 determines whether any triangles formed with the POI in block 1221 include angles formed off of the base which are ninety (90) degrees or less. If the result of decision block 1222 is positive, subroutine 1200 proceeds to a block 1226 where the segment forming the base of the triangle is set as the beginning of the multi-point incident on the desired route. It will be appreciated that if more than one segment that is closer than a minimum distance to the POI forms such a triangle, then the first of any such segments is set as the beginning of the multi-point incident. Subroutine 1200 then proceeds to a block 1228 so that the points of the multi-point incident can be examined in reverse sequential order to determine the last segment upon which the multi-point incident occurs, as will be described in more detail below. However, if no remaining segment forms a triangle such that the angles formed off of the base of the triangle are ninety (90) degrees or less, then subroutine 1200 proceeds from block 1222 to a block 1224 where the segment of the desired route having a point closest to the current POI is set as the beginning of the multi-point incident on the desired route. Routine 1200 then proceeds to a block 1228.

At block 1228 the sequential order of the undiscarded points along the multi-point incident is reversed. Routine 1200 then proceeds to block 1234 of FIG. 12C where the first point in the reversed sequence points along the multi-point incident is chosen for analysis as the POI. Next, at a block 1236, the POI is compared with all segments of the desired route to determine if the POI is located within the region of interest of any segments. Accordingly, all segments whose perimeters enclose the POI are stored for further analysis. Next, in a decision block 1238, the subroutine 1200 determines whether any segments were stored in block 1236. If no segments were stored, then routine 1200 branches to a block 1250 where the current POI is discarded from further consideration and the next available point in the reversed sequence of points along the multi-point incident is assigned as the current POI. Routine 1200 then proceeds back to block 1236 to continue the analysis of the multi-point incident. On the other hand, if at block 1238 it is determined that at least one segment was stored in block 1236, i.e., the current POI fell within the region of interest of at least one segment of the desired route, subroutine 1200 proceeds to a decision block 1240.

In decision block 1240, the subroutine 1200 determines whether the POI is closer than a minimum distance to any point along any of the segments stored in block 1236. As noted above, in one actual embodiment of the present invention, this minimum distance varies with the granularity of the route. Accordingly, a value substantially similar to the padding value assigned in block 1105 of FIG. 11A is used as the minimum. If no stored segments are closer than the minimum distance to the current POI, then routine 1200 branches to block 1250 as described above. If at least one segment is closer than the minimum distance to the POI, then routine 1200 proceeds to block 1241 in which a triangle is formed between the current POI and the end points of each such segment as described above in connection with block 1221 of FIG. 12B.

Next, in a decision block 1242, the subroutine 1200 determines whether any of the triangles formed in block 1241 include angles formed off of the base that are ninety (90) degrees or less. If so, subroutine 1200 proceeds to block 1226 where the segment forming the base of the triangle is set as the end of the multi-point incident on the desired route. It will be appreciated that if more than one segment that is closer than a minimum distance to the POI forms such a triangle, then the first of any such segments is set as the end of the multi-point incident. Subroutine 1200 then proceeds to a block 1296 as described below. However, if no remaining segment forms a triangle such that the angles formed off of the base of the triangle are ninety (90) degrees or less, then routine 1200 proceeds from block 1246 to block 1244 where the segment of the desired route having a point closest to the current POI is set as the end of the multi-point incident on the desired route. Once the end of the multi-point incident has been set, routine 1200 ends in block 1296 and processing returns to block 935 in FIG. 9 indicating that the incident falls on the desired route from the beginning segment to the end segment.

In light of the above, it should be appreciated that the present invention provides a method and system for analyzing and depicting travel routes along with incidents occurring on those travel routes. Aspects of the current invention may be utilized by a consumer to request a depiction of their desired route. The desired route, including any incidents along the desired route may then be depicted for the consumer. In this manner, a consumer can easily determine if and when it is best to travel along a particular route without having to actual travel along the route.

While an illustrative embodiment of the invention has been illustrated and described, it will be appreciated that various changes can be made therein without departing from the spirit and scope of the invention. For example, although the incidents processed and depicted by the present invention are described above as traffic incidents, it will be appreciated that any type of incident, event, or location, e.g., a parade, a particular type of restaurant, a service station, sporting event, etc., can be processed and depicted by the present invention, and referred to as an incident.

What is claimed is:

1. A method for depicting incidents along a desired route, wherein the desired route comprises a plurality of segments, the method comprising:

receiving segment data describing at least one segment of the desired route;

locating at least one region of interest around each segment of the desired route;

receiving incident data comprising a description of at least one incident occurring at a single location;

for each at least one region of interest, determining if any available incidents fall within the at least one region;

for each available incident falling within at least one region determining if the available incident has occurred on at least one segment by:

determining if the incident corresponding to the incident data is closer than a threshold distance to the at least one segment;

forming a triangle from the available incident to the end points of any at least one segment closer than a threshold distance, wherein the base of the triangle is the segment; and choosing any segment in which the angles of said triangle formed with the base are ninety degrees or less; and for each available incident occurring on at least one segment, depicting the incident on the desired route.

2. A method for depicting incidents along a desired route, wherein the desired route comprises a plurality of segments, the method comprising:

receiving segment data describing at least one segment of the desired route;

locating at least one region of interest around each segment of the desired route;

receiving incident data comprising a description of at least one incident occurring at a single location;

for each at least one region of interest, determining if any available incidents fall within the at least one region;

for each available incident falling within at least one region determining if the available incident has occurred on at least one segment by:
  determining if the incident corresponding to the incident data is closer than a threshold distance to the at least one segment;
  forming a triangle from the available incident to the end points of any at least one segment closer than a threshold distance, wherein the base of the triangle is the segment;
  choosing any segment in which the angles of said triangle formed with the base are ninety degrees or less; otherwise
  if none of the segments forms a triangle in which the angles formed with the base are ninety degrees or less, choosing the closest of the segments to the available incident; and
  for each available incident occurring on at least one segment, depicting the incident on the desired route.

3. A method for depicting incidents along a desired route, wherein the desired route comprises a plurality of segments, the method comprising:

receiving segment data describing at least one segment of the desired route;

locating at least one region of interest around each segment of the desired route;

receiving incident data comprising a description of at least one incident occurring at a multi-point location comprising a plurality of incident points;

for each at least one region of interest, determining if any available incidents fall within the at least one region;

for each available incident falling within at least one region, determining if the available incident has occurred on at least one segment by:
  for each incident point, determining in sequential order if any of the incident points is closer than a threshold distance to any segment;
  for a first incident point determined to be closer than the threshold distance, setting the segment to which the first incident point is closer than the threshold distance as the first segment of the incident on the desired route;
  for each incident point, determining in reverse sequential order a second incident point which is closer than the threshold distance to any segment; and
  for the second incident point, setting the segment to which the second incident point is closer than the threshold distance as the last segment of the incident on the desired route; and
  for each available incident occurring on at least one segment, depicting the incident on the desired route.

4. The method of claim 3, further comprising:

if none of the incident points is determined to be closer than the threshold distance to any segment, then concluding the available incident does not fall on the desired route.

5. A method for depicting incidents along a desired route, wherein the desired route comprises a plurality of segments, the method comprising:

receiving segment data describing at least one segment of the desired route;

locating at least one region of interest around each segment of the desired route;

receiving incident data comprising a description of at least one incident occurring at a multi-point location comprising a plurality of incident points;

for each at least one region of interest, determining if any available incidents fall within the at least one region;

for each available incident falling within at least one region determining if the available incident has occurred on at least one segment by:
  for each incident point, determining in sequential order if any of the incident points is closer than a threshold distance to any segment;
  for a first incident point determined to be closer than the threshold distance, forming a triangle from the incident point to the end points of the segment closer than the threshold distance, wherein the base of the triangle is the segment;
  setting the segment to which the first incident point is closer than the threshold distance and in which the angles of said triangle formed with the base are ninety degrees or less, as the first segment of the incident on the desired route;
  for each incident point, determining in reverse sequential order a second incident point which is closer than the threshold distance to any segment;
  for the second incident point determined to be closer than the threshold distance, forming a triangle from the second incident point to the end points of the segment closer than the threshold distance, wherein the base of the triangle is the segment; and
  setting the segment to which the second incident point is closer than the threshold distance and in which the angles of said triangle formed with the base are ninety degrees or less, as the last segment of the incident on the desired route; and
  for each available incident occurring on at least one segment, depicting the incident on the desired route.

6. The method of claim 5, further comprising:

if none of the incident points is determined to be closer than the threshold distance to any segment, then concluding the available incident does not fall on the desired route.

7. A system for depicting incidents along a desired route, comprising:

a route depiction device operative to depict the desired route, as well as any incidents along the desired route; and an information server operative to:

receive segment data describing at least one segment of the desired route from a map server;

locate at least one region of interest around each segment of the desired route;

receive incident data comprising a description of at least one incident occurring at a single location from an incident server;

for each at least one region, determine if any available incidents fall within the at least one region;

for each available incident falling within at least one region, determine if the available incident has occurred along the at least one segment by:
  determining if the incident corresponding to the incident data is closer than a threshold distance to the at least one segment;
  forming a triangle from the available incident to the end points of any at least one segment closer than a threshold distance, wherein the base of the triangle is the segment; and choosing any segment in which the angles of said triangle formed with the base are ninety degrees or less; and <for each available incident occurring on at least one segment, providing the route depiction device with the incident so that the route depiction device may depict the incident along the desired route.

8. A system for depicting incidents along a desired route, comprising:
a route depiction device operative to depict the desired route, as well as any incidents along the desired route; and
an information server operative to:
receive segment data describing at least one segment of the desired route from a map server;
locate at least one region of interest around each segment of the desired route;
receive incident data comprising a description of at least one incident occurring at a single location from an incident server;
for each at least one region, determine if any available incidents fall within the at least one region;
for each available incident falling within at least one region, determine if the available incident has occurred along the at least one segment by:
determining if the incident corresponding to the incident data is closer than a threshold distance to the at least one segment;
forming a triangle from the available incident to the end points of any at least one segment closer than a threshold distance, wherein the base of the triangle is the segment;
choosing any segment in which the angles of said triangle formed with the base are ninety degrees or less; otherwise
if none of the segments forms a triangle in which the angles formed with the base are ninety degrees or less, choosing the closest of the segments to the available incident; and
for each available incident occurring on at least one segment, providing the route depiction device with the incident so that the route depiction device may depict the incident along the desired route.

9. A system for depicting incidents along a desired route, comprising:
a route depiction device operative to depict the desired route, as well as any incidents along the desired route; and
an information server operative to:
receive segment data describing at least one segment of the desired route from a map server;
locate at least one region of interest around each segment of the desired route;
receive incident data comprising a description of at least one incident occurring at a multi-point location comprising a plurality of incident points from an incident server;
for each at least one region, determine if any available incidents fall within the at least one region;
for each available incident falling within at least one region, determine if the available incident has occurred along the at least one segment by:
for each incident point, determining in sequential order if any of the incident points is closer than a threshold distance to any segment;
for a first incident point determined to be closer than the threshold distance, setting the segment to which the first incident point is closer than the threshold distance as the first segment of the incident on the desired route;
for each incident point, determining in reverse sequential order a second incident point which is closer than the threshold distance to any segment; and
for the second incident point, setting the segment to which the second incident point is closer than the threshold distance as the last segment of the incident on the desired route; and
for each available incident occurring on at least one segment, providing the route depiction device with the incident so that the route depiction device may depict the incident along the desired route.

10. The system of claim 9, wherein the information server is operative to determine if none of the incident points is determined to be closer than the threshold distance to any segment, then to conclude the available incident does not fall on the desired route.

11. A system for depicting incidents along a desired route, comprising:
a route depiction device operative to depict the desired route, as well as any incidents along the desired route; and
an information server operative to:
receive segment data describing at least one segment of the desired route from a map server;
locate at least one region of interest around each segment of the desired route;
receive incident data comprising a description of at least one incident occurring at a multi-point location comprising a plurality of incident points from an incident server;
for each at least one region, determine if any available incidents fall within the at least one region;
for each available incident falling within at least one region determine if the available incident has occurred along the at least one segment by:
for each incident point, determining in sequential order if any of the incident points is closer than a threshold distance to any segment;
for a first incident point determined to be closer than the threshold distance, forming a triangle from the incident point to the end points of the segment closer than the threshold distance, wherein the base of the triangle is the segment;
setting the segment to which the first incident point is closer than the threshold distance and in which the angles of said triangle formed with the base are ninety degrees or less, as the first segment of the incident on the desired route;
for each incident point, determining in reverse sequential order a second incident point which is closer than the threshold distance to any segment;
for the second incident point determined to be closer than the threshold distance, forming a triangle from the second incident point to the end points of the segment closer than the threshold distance, wherein the base of the triangle is the segment; and
setting the segment to which the second incident point is closer than the threshold distance and in which the angles of said triangle formed with the base are ninety degrees or less, as the last segment of the incident on the desired route; and
for each available incident occurring on at least one segment, providing the route depiction device with the incident so that the route depiction device may depict the incident along the desired route.

12. The system of claim 11, wherein the information server is operative to determine if none of the incident points is determined to be closer than the threshold distance to any segment, then to conclude that the available incident does not fall on the desired route.

13. A computer-readable medium having a computer executable component for depicting incidents along a desired route, wherein the computer executable component depicts a desired route by:
   obtaining incident data comprising a description of at least one incident occurring at a single location;
   comparing the incident data to the desired route to determine if any available incidents fall within a predetermined region of interest surrounding the desired route wherein comparing the incident to the desired route comprises:
      determining if the incident corresponding to the incident data is closer than a threshold distance to the at least one segment;
      forming a triangle from the available incident to the end points of any at least one segment closer than a threshold distance, wherein the base of the triangle is the segment; and
      choosing any segment in which the angles of said triangle formed with the base are ninety degrees or less; and
      depicting the desired route along with any available incidents determined to fall within the region of interest.

14. A computer-readable medium having a computer executable component for depicting incidents along a desired route, wherein the computer executable component depicts a desired route by:
   obtaining incident data comprising a description of at least one incident occurring at a single location;
   comparing the incident data to the desired route to determine if any available incidents fall within a predetermined region of interest surrounding the desired route wherein comparing the incident to the desired route comprises:
      determining if the incident corresponding to the incident data is closer than a threshold distance to the at least one segment;
      forming a triangle from the available incident to the end points of any at least one segment closer than a threshold distance, wherein the base of the triangle is the segment;
      choosing any segment in which the angles of said triangle formed with the base are ninety degrees or less; otherwise
      if none of the segments forms a triangle in which the angles formed with the base are ninety degrees or less, choosing the closest of the segments to the available incident; and
      depicting the desired route along with any available incidents determined to fall within the region of interest.

15. A computer-readable medium having a computer executable component for depicting incidents along a desired route, wherein the computer executable component depicts a desired route by:
   obtaining incident data comprising a description of at least one incident occurring at a multi-point location comprising a plurality of incident points;
   comparing the incident data to the desired route to determine if any available incidents fall within a predetermined region of interest surrounding the desired route wherein comparing the incident data to the desired route comprises:
      for each incident point, determining in sequential order if any of the incident points is closer than a threshold distance to any segment;
      for a first incident point determined to be closer than the threshold distance, setting the segment to which the first incident point is closer than the threshold distance as the first segment of the incident on the desired route;
      for each incident point, determining in reverse sequential order a second incident point which is closer than the threshold distance to any segment; and
      for the second incident point, setting the segment to which the second incident point is closer than the threshold distance as the last segment of the incident on the desired route; and
      depicting the desired route along with any available incidents determined to fall within the region of interest.

16. The computer-readable medium of claim 15, further comprising:
   if none of the incident points is determined to be closer than the threshold distance to any segment, then concluding the available incident does not fall on the desired route.

17. A computer-readable medium having a computer executable component for depicting incidents along a desired route, wherein the computer executable component depicts a desired route by:
   obtaining incident data comprising a description of at least one incident occurring at a multi-point location comprising a plurality of incident points;
   comparing the incident data to the desired route to determine if any available incidents fall within a predetermined region of interest surrounding the desired route wherein comparing the incident data to the desired route comprises:
      for each incident point, determining in sequential order if any of the incident points is closer than a threshold distance to any segment;
      for a first incident point determined to be closer than the threshold distance, forming a triangle from the incident point to the end points of the segment closer than the threshold distance, wherein the base of the triangle is the segment;
      setting the segment to which the first incident point is closer than the threshold distance and in which the angles of said triangle formed with the base are ninety degrees or less, as the first segment of the incident on the desired route;
      for each incident point, determining in reverse sequential order a second incident point which is closer than the threshold distance to any segment;
      for the second incident point determined to be closer than the threshold distance, forming a triangle from the second incident point to the end points of the segment closer than the threshold distance, wherein the base of the triangle is the segment; and setting the segment to which the second incident point is closer than the threshold distance and in which the angles of said triangle formed with the base are ninety degrees or less, as the last segment of the incident on the desired route; and depicting the desired route along with any available incidents determined to fall within the region of interest.

18. The computer-readable medium of claim 17, further comprising:

if none of the incident points is determined to be closer than the threshold distance to any segment, then concluding the available incident does not fall on the desired route.

* * * * *